US012770358B2

(12) United States Patent
Tsunoda

(10) Patent No.: US 12,770,358 B2

(45) Date of Patent: Oct. 20, 2026

(54) IMAGE PROCESSING APPARATUS, TRAINING APPARATUS, IMAGE PROCESSING METHOD, TRAINING METHOD, AND NON-TRANSITORY COMPUTER-READABLE STORAGE MEDIUM

(71) Applicant: CANON KABUSHIKI KAISHA, Tokyo (JP)

(72) Inventor: Takamasa Tsunoda, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 244 days.

(21) Appl. No.: 18/444,492

(22) Filed: Feb. 16, 2024

(65) Prior Publication Data

US 2024/0282077 A1 Aug. 22, 2024

(30) Foreign Application Priority Data

Feb. 22, 2023 (JP) ................................ 2023-026043

(51) Int. Cl.

*G06V 10/48* (2022.01)
*G06V 10/80* (2022.01)
*G06V 10/98* (2022.01)

(52) U.S. Cl.

CPC .............. *G06V 10/48* (2022.01); *G06V 10/80* (2022.01); *G06V 10/993* (2022.01)

(58) Field of Classification Search

CPC ...... G06V 10/48; G06V 10/80; G06V 10/993; G06V 10/82

See application file for complete search history.

(56) References Cited

U.S. PATENT DOCUMENTS

| | | | | |
|---|---|---|---|---|
| 5,317,420 | A * | 5/1994 | Kuwahara | G06T 5/20 382/163 |
| 2022/0180625 | A1* | 6/2022 | Ahn | G06N 3/09 |
| 2023/0368557 | A1* | 11/2023 | Kolavennu | G06F 18/23 |

FOREIGN PATENT DOCUMENTS

| | | | |
|---|---|---|---|
| JP | 2010147660 | A | 7/2010 |
| JP | 2012043151 | A | 3/2012 |

OTHER PUBLICATIONS

Fan, Z, et al., "A Segmentation-aware Deep Fusion Network for Compressed Sensing MRI".
Guo, S., et al. "Toward Convolutional Blind Denoising of Real Photographs", Computer Vision Foundation, pp. 1712-1722.
Liu, D., et al., "When Image Denoising Meets High-Level Vision Tasks: A Deep Learning Approach", Apr. 16, 2018.

* cited by examiner

*Primary Examiner* — John B Strege

(74) *Attorney, Agent, or Firm* — Canon.U.S.A., Inc. IP Division

(57) ABSTRACT

An image processing apparatus includes a feature extractor, a map estimator, a first image estimator, a second image estimator, and an outputter. The feature extractor extracts an intermediate feature from an input image. The map estimator estimates an area map from the intermediate feature. The first image estimator estimates a first image from the intermediate feature. The second image estimator estimates a second image from the intermediate feature. The outputter outputs an output image obtained by, based on the area map, merging the first image and the second image. The second image estimator is trained to obtain desired image quality at a particular area based on the area map in the second image.

15 Claims, 10 Drawing Sheets

IMAGE PROCESSING APPARATUS, TRAINING APPARATUS, IMAGE PROCESSING METHOD, TRAINING METHOD, AND NON-TRANSITORY COMPUTER-READABLE STORAGE MEDIUM

BACKGROUND

Technical Field

The present disclosure relates to an image processing apparatus, a training apparatus, an image processing method, a training method, and a non-transitory computer-readable storage medium.

Description of the Related Art

There exists a technique called area-by-area noise reduction processing, in which noise reduction processing for reducing noise contained in an input image is performed on a subject-area-by-subject-area basis for the image. Japanese Patent Laid-Open No. 2010-147660 discloses area-by-area noise reduction processing of segmenting an image into a plurality of subject areas on the basis of subject distance information and changing the preset intensity or the preset number of times of execution of low-pass filter processing on the basis of a spatial frequency of each subject.

Recently, noise reduction processing that is an application of deep learning technologies has been proposed. "When Image Denoising Meets High-Level Vision Tasks: A Deep Learning Approach" discloses a technique for performing noise reduction processing using a noise reduction convolutional neural network (hereinafter abbreviated as "CNN") for noise reduction, a semantic segmentation CNN for semantic segmentation, and an image classification CNN for image classification. In "When Image Denoising Meets High-Level Vision Tasks: A Deep Learning Approach", training of a noise reduction CNN is performed using a pre-trained semantic segmentation CNN and a pre-trained image classification CNN to learn noise reduction processing that achieves an improvement in semantic segmentation and image classification.

"A Segmentation-aware Deep Fusion Network for Compressed Sensing MRI" discloses a CNN that simultaneously performs noise reduction processing and semantic segmentation of a tomographic brain image acquired using a magnetic resonance imaging (MRI) method. This CNN is made up of two modules, specifically, a module that performs semantic segmentation and a module that performs noise reduction processing, and performs noise reduction processing on an input image using features of intermediate layers in semantic segmentation.

There exists a case where image processing such as noise reduction processing, super-resolution processing, or the like is wanted to be applied with different characteristics on an image-area-by-image-area basis. One of examples is a case where noise reduction processing with an importance placed on ease of visual recognition is wanted to be applied to characters and/or a person included in an image and noise reduction processing with an importance placed on image quality is wanted to be applied to areas other than the characters and/or the person. Another example is a case where, since image recognition processing is applied to characters and/or a person, noise reduction processing is wanted to be performed in such a way as to enhance precision in character classification and/or person detection and noise reduction processing with an importance placed on image quality is wanted to be applied to areas other than the characters and/or the person.

In Japanese Patent Laid-Open No. 2010-147660, noise reduction processing is performed while varying the content of low-pass filter processing from one subject area to another within preset parameters regarding low-pass filter processing; therefore, there is a limit in noise reduction processing that can be applied on an area-by-area basis.

In "When Image Denoising Meets High-Level Vision Tasks: A Deep Learning Approach", a noise-reduced image from a noise reduction CNN is inputted into another network that performs a higher-order recognition task, and the noise reduction CNN is trained using a loss of the task and a loss for noise reduction. By this means, the CNN learns noise reduction processing that improves the precision of the higher-order recognition task. If semantic segmentation is chosen as the higher-order recognition task, it is possible to learn noise reduction processing that improves precision in area-by-area category classification. However, when this method is used, it is impossible to set areas to which noise reduction processing with different characteristics are to be applied, and therefore noise reduction processing that improves precision in category classification is applied to the entire area of an image. Also when the method disclosed in "A Segmentation-aware Deep Fusion Network for Compressed Sensing MRI is used, it is impossible to set areas to which noise reduction processing with different characteristics are to be applied, and therefore noise reduction processing of the same characteristics is applied to the entire area of an image.

SUMMARY

An image processing apparatus according to a certain aspect of the present disclosure includes a feature extractor, a map estimator, a first image estimator, a second image estimator, and an outputter. The feature extractor extracts an intermediate feature from an input image. The map estimator estimates an area map from the intermediate feature. The first image estimator estimates a first image from the intermediate feature. The second image estimator estimates a second image from the intermediate feature. The outputter outputs an output image obtained by, based on the area map, merging the first image and the second image. The second image estimator is trained to obtain predetermined image quality at a particular area based on the area map in the second image.

Further features of the present disclosure will become apparent from the following description of exemplary embodiments with reference to the attached drawings.

DESCRIPTION OF THE EMBODIMENTS

With reference to the accompanying drawings, some embodiments of the present disclosure will now be described. Note that the configuration disclosed in the embodiments to be described below is just an example, and the scope of the present disclosure shall not be construed to be limited to the illustrated configuration.

First Embodiment

In the present embodiment, an example of noise reduction processing of estimating an image before degradation due to noise (hereinafter referred to also as "noiseless image" or "before-degradation image") from a noise-degraded image (hereinafter referred to also as "noisy image" or "degraded image") will be described.

Figure 1A:
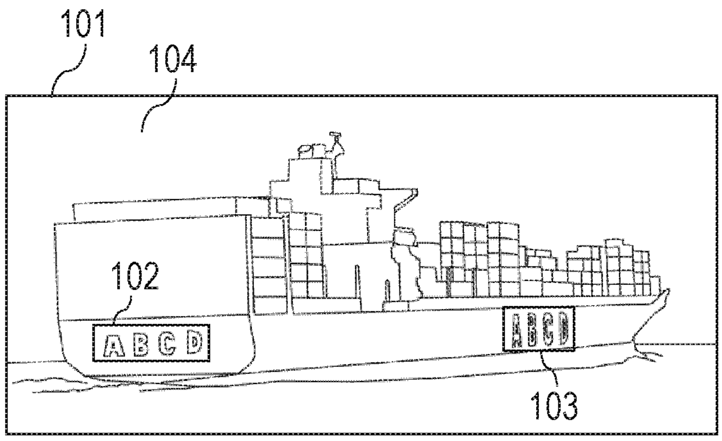
FIG. 1A is a diagram for explaining a noiseless image.
Figure 1B:
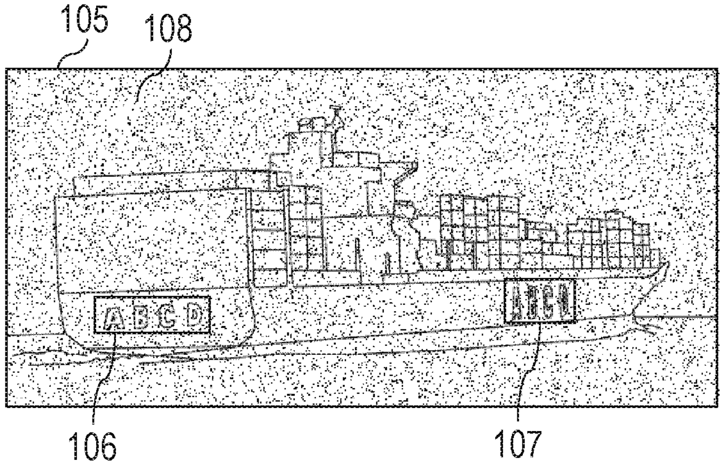
FIG. 1B is a diagram for explaining a noisy image.

FIG. 1A is a diagram illustrating an example of a noiseless image before degradation due to noise. A noiseless image 101 illustrated as an example in FIG. 1A shows a ship on the sea. In FIG. 1A, 102 and 103 denote areas of characters on the body of the ship, and 104 denotes an area other than these character areas. FIG. 1B is a diagram illustrating an example of a noisy image 105, which is a noise-degraded image showing the same scene as that of the noiseless image 101 illustrated in FIG. 1A. In FIG. 1B, 106 and 107 denote areas of characters on the body of the ship respectively at the same positions as those of the areas 102 and 103 illustrated in FIG. 1A, and 108 denotes an area other than these character areas.

As used herein, the term noise includes noise that is produced in the process of conversion of a photon detected by a sensor into a digital signal, but is not limited thereto. The noise may be any other kind of noise. Examples of the origin of the noise are: photon shot noise, read-out noise, dark current noise, quantization error noise, and they are assumed to be modeled. That is, it is assumed that a noisy image (for example, the image 105 illustrated in FIG. 1B) can be generated by artificially generating noise using a noise model and applying the artificially-generated noise to a noiseless image (for example, the image 101 illustrated in FIG. 1A).

Noise reduction processing is, basically, processing of reconstructing a noiseless image such as the image 101 illustrated in FIG. 1A from a noisy image such as the image 105 illustrated in FIG. 1B. In noise reduction processing according to the present embodiment, reconstruction is performed with an importance placed on ease of visual recognition of a character(s), not on image quality, for a character area included in an image, and reconstruction is performed with an importance placed on image quality for an area other than the character area included in the image. That is, the present embodiment realizes noise reduction processing with an importance placed on ease of visual recognition of characters for a character area included in an image, and noise reduction processing with an importance placed on image quality, which is different in characteristics from those of the character area, for an area other than the character area included in the image.

Figure 2:
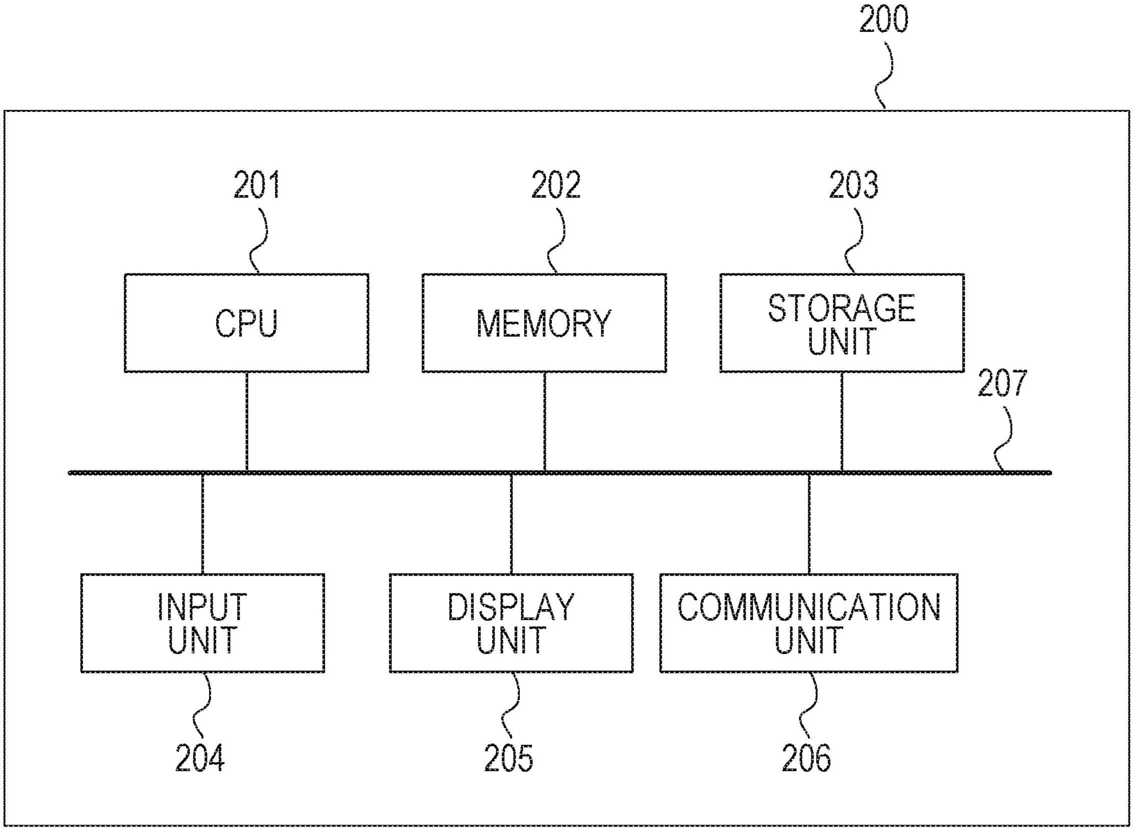
FIG. 2 is a diagram illustrating an example of a hardware configuration of an image processing apparatus.

FIG. 2 is a block diagram illustrating an example of a hardware configuration of an image processing apparatus according to the present embodiment. An image processing apparatus 200 includes a CPU 201, a memory 202, a storage unit 203, an input unit 204, a display unit 205, a communication unit 206, and a system bus 207. The CPU 201, the memory 202, the storage unit 203, the input unit 204, the display unit 205, and the communication unit 206 are connected in such a way as to be able to perform communication therebetween via the system bus 207. The image processing apparatus 200 may further include any component other than them.

The CPU (Central Processing Unit) 201 is responsible for overall control on the image processing apparatus 200. The CPU 201 controls, for example, operation of each functional unit connected via the system bus 207. The memory 202 stores programs and various kinds of data used by the CPU 201 for processing. In addition, the memory 202 has a function as a main memory, a work area, and the like of the CPU 201. Functions and processing of the image processing apparatus to be described later are implemented by the CPU 201 performing processing on the basis of the programs stored in the memory 202. Any processor other than the CPU may be used for implementation of functions and processing of the image processing apparatus to be described later. For example, a GPU (Graphics Processing Unit) may be used in place of the CPU.

The storage unit 203 stores, for example, various kinds of data and the like needed when the CPU 201 performs processing pertaining to the programs. In addition, the storage unit 203 stores, for example, various kinds of data and the like obtained as the results of the CPU 201 performing processing pertaining to the programs. The programs and various kinds of data used by the CPU 201 for processing may be stored in the storage unit 203. The input unit 204 includes an operation member such as a mouse, buttons and inputs user operations into the image processing apparatus 200. The display unit 205 includes a display component such as a liquid crystal display and displays the results of processing by the CPU 201 and the like. The communication unit 206 connects the image processing apparatus 200 to a network and controls communication with another apparatus or the like.

A training apparatus to be described later, and an image processing apparatus and a training apparatus according to other embodiments, also have the same hardware configuration as the hardware configuration of the image processing apparatus illustrated in FIG. 2.

Figure 3A:
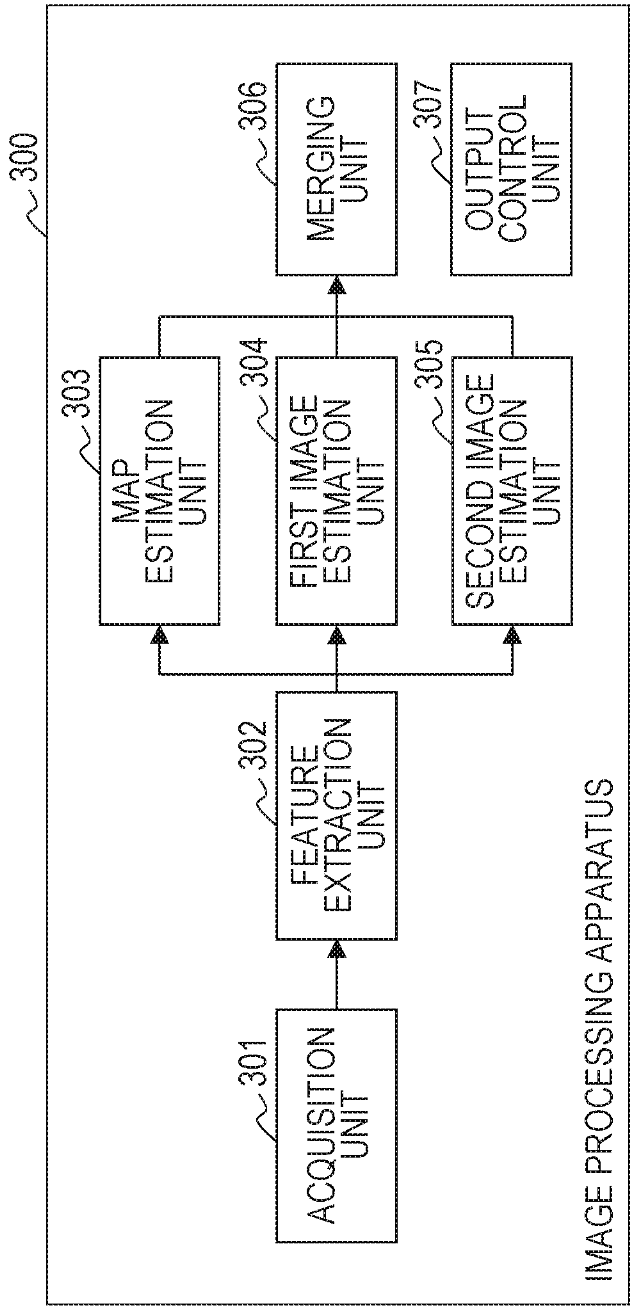
FIG. 3A is a diagram illustrating an example of a functional configuration of the image processing apparatus.

FIG. 3A is a block diagram illustrating an example of a functional configuration of the image processing apparatus according to the first embodiment. In FIG. 3A, an example of a functional configuration of the image processing apparatus according to the first embodiment for performing processing during run time is illustrated. "During run time" mentioned here means that it is at the time of performing noise reduction processing on an image. An image processing apparatus 300 includes an acquisition unit 301, a feature extraction unit 302, a map estimation unit 303, a first image estimation unit 304, a second image estimation unit 305, a merging unit 306, and an output control unit 307. The function of each of these blocks will now be described with reference to FIG. 4A and the like.

Figure 4A:
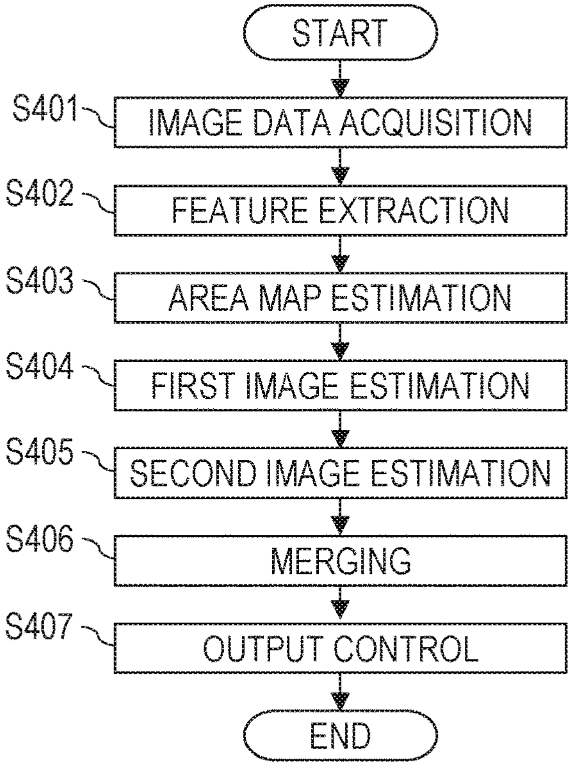
FIG. 4A is a flowchart illustrating an example of processing during run time.

FIG. 4A is a flowchart illustrating an example of processing during run time (noise reduction processing) of the image processing apparatus according to the first embodiment.

In step S401, the acquisition unit 301 acquires image data of an input image. The image data acquired by the acquisition unit 301 is image data of a noisy image that is the target of noise reduction processing. The image data may be data of an image having three channels of RGB, or may be a grayscale image or a hyperspectral image. Data other than an image may be added to input data. For example, in Publication A shown below, at an upstream stage, a noise level map is estimated from a noisy image, the noisy image is coupled to the estimated noise level map, and they are inputted into a noise reduction network of a downstream stage to reconstruct a noise-reduced image. As in this example, non-image information may be inputted in association with the noisy image.

Publication A: Shi Guo, Zifei Yan, Kai Zhang, Wangmeng Zuo, Lei Zhang, "Toward Convolutional Blind Denoising of Real Photographs", CVPR 2019, 2019

Figure 7A:
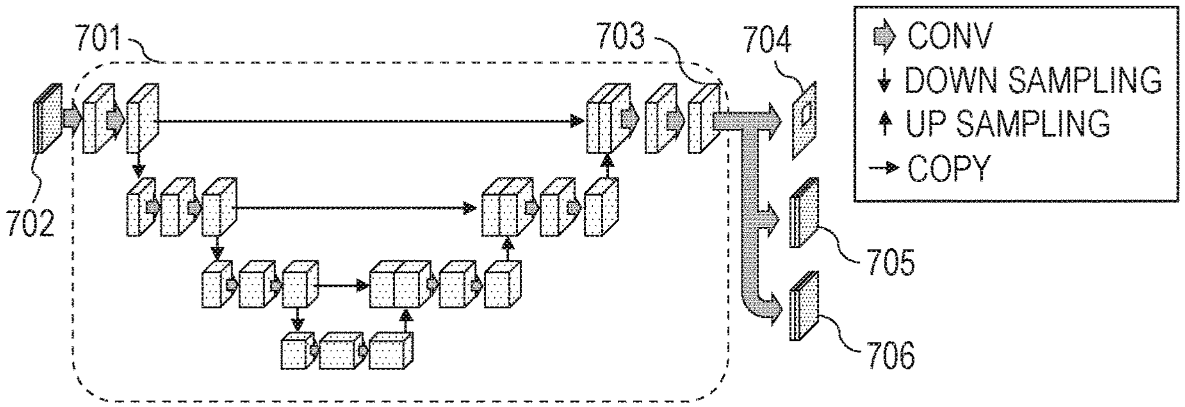
FIG. 7A is a diagram for explaining an example of a configuration of a neural network.

In step S402, the feature extraction unit 302 extracts an intermediate feature from the image data acquired in step S401. Processing in steps S402 to S406 of the flowchart illustrated in FIG. 4A can be realized by, for example, one neural network as illustrated in FIG. 7A. In FIG. 7A, 701 denotes a portion that performs processing corresponding to intermediate feature extraction in step S402; hierarchical coding and decoding are performed at a convolutional layer, a pooling layer, and the like on an input image 702 to generate an intermediate feature 703.

In step S403, by using a pre-trained model obtained through training processing to be described later, the map estimation unit 303 estimates an area map from the intermediate feature extracted in step S402. The area map is a map that indicates whether the area is an area where an importance is placed on image quality ("image-quality-first" noise reduction processing is to be performed) or an area where an importance is placed on ease of visual recognition of characters ("character-recognition-first" noise reduction processing is to be performed). In the present embodiment, the area map is a map that indicates a particular area where an importance is placed on ease of visual recognition of characters in an image that is the target of processing, that is, a map of the character area. This map is assumed to be a one-channel map having the same vertical and horizontal size as that of the input image. Each pixel of this map takes a real-number value from 0 to 1. The closer this value is to 1, the greater the likelihood of a character is. That is, in the present embodiment, an area where the value is closer to 1 is treated as an area where an importance is placed on ease of visual recognition of characters, and an area where the value is closer to 0 is treated as an area where an importance is placed on image quality. In FIG. 7A, 704 denotes the area map. The area map 704 is estimated at a convolutional layer from the intermediate feature 703 and is multiplied by a sigmoid activation function. However, the intermediate feature from which the area map 704 is estimated is not limited to 703. For example, an output of a first-tier convolutional layer in 701, or an output of a middle-neighborhood layer, may be employed. The number of convolutional layers for estimating the area map 704 is also not limited, and the estimation may be performed via a multi-layer network made up of any number of convolutional layers, activation layers, and the like.

In step S404, by using a pre-trained model obtained through training processing to be described later, the first image estimation unit 304 estimates a first image from the intermediate feature extracted in step S402. In the present embodiment, the first image is an "image-quality-first" image reconstructed with an importance placed on image quality in noise reduction processing. The first image (image-quality-first image) is an image having the same vertical and horizontal size and the same number of channels as those of the input image. In FIG. 7A, 705 denotes the first image. The first image 705 is estimated at a convolutional layer from the intermediate feature 703. However, the intermediate feature from which the first image 705 is estimated is not limited to 703 but may be an intermediate feature at any position in 701, as is the case with the area map 704. The number of convolutional layers for estimating the first image 705 is also not limited, and the estimation may be performed via a multi-layer network made up of any number of convolutional layers, activation layers, and the like.

In step S405, by using a pre-trained model obtained through training processing to be described later, the second image estimation unit 305 estimates a second image from the intermediate feature extracted in step S402. In the present embodiment, the second image is a "character-recognition-first" image reconstructed with an importance placed on ease of visual recognition of characters in noise reduction processing. The second image (character-recognition-first image) is also an image having the same vertical and horizontal size and the same number of channels as those of the input image. In FIG. 7A, 706 denotes the second image. The second image 706, similarly to the first image 705, is estimated at a convolutional layer from the intermediate feature 703. However, the intermediate feature from which the second image 706 is estimated is not limited to 703 but may be an intermediate feature at any position in 701, as is the case with the first image 705. The number of convolutional layers for estimating the second image 706 is also not limited, and the estimation may be performed via a multi-layer network made up of any number of convolutional layers, activation layers, and the like.

In step S406, based on the estimation results in steps S403, S404, and S405, the merging unit 306 generates and outputs a final output image (an image to which noise reduction processing has been applied). The merging unit 306 is an example of an outputter. The merging unit 306 uses the area map estimated in step S403, the first image estimated in step S404, and the second image estimated in step S405, and merges the first image and the second image on the basis of the area map to generate an output image. The merging unit 306 performs this merging such that a ratio of pixel information of the first image is set to be high for (i.e., set to contribute greatly to) an area where an importance is placed on image quality and such that a ratio of pixel information of the second image is set to be high for (i.e., set to contribute greatly to) an area where an importance is placed on ease of visual recognition of characters.

Each pixel of the area map takes a real-number value from 0 to 1, and an area where the value is closer to 1 is treated as an area where an importance is placed on ease of visual recognition of characters. Let $map_2$ be the area map. Let $img_1$ be the first image. Let $img_2$ be the second image. Given these definitions, a merged image $img_{final}$ can be generated through computation expressed by the formula shown below in Equation 1. That is, it is possible to generate a merged image (output image) by merging the first image and the second image at a ratio corresponding to a value indicated by the area map for each pixel.

$$Img_{final} = (1 - \mathrm{map}_2) \odot img_1 + \mathrm{map}_2 \odot img_2, \quad (1)$$

where ⊙ denotes multiplication for each element.

In Equation 1, for example, area map $\mathrm{map}_2$ may be binarized with respect to a predetermined threshold so as to take a real-number value of 0 or 1. In this case, a merged image is generated with the first image taken for an area where the value of the area map is 0, that is, an area where an importance is placed on image quality, and with the second image taken for an area where the value of the area map is 1, that is, an area where an importance is placed on ease of visual recognition of characters.

Conversion into an appropriate scale and/or an appropriate data type is performed regarding the merged image $img_{final}$. For example, suppose the following case: training has been performed such that each pixel of the input image 702, the first image 705, and the second image 706 in the neural network illustrated in FIG. 7A takes a real-number value from 0 to 1, and the type of the original of a training image is an unsigned 8-bit integer type. In this case, for the purpose of conversion into an unsigned 8-bit image format, the value of each pixel of the merged image is multiplied by 255 for casting into the unsigned 8-bit integer type (data-type conversion is performed).

In step S407, the output control unit 307 performs control for outputting each generated image to an output device. In this step S407, in addition to displaying the output image (merged image) generated in step S406 on a display device or the like, data having been generated through the processing up to step S407 may be visualized. If there is no need to perform display immediately, each generated image and the like may be stored into a storage device or the like as appropriate instead of performing the processing in step S407, and the stored image, etc. may be outputted when display is performed.

For example, the area map estimated and generated in step S403 indicates a particular area where an importance is placed on ease of visual recognition of characters in an image. This area where an importance is placed on ease of visual recognition of characters is an area where the ratio of pixel information of the second image (that is, the character-recognition-first image) was set to be high at the time of generating the merged image. When display is performed on the display device, the area map may be superimposed on the merged image. Specifically, the following display control is conceivable: display control of extracting edges of the particular area from the area map and superimposing the extracted edges in a colored manner such as in red or any other suitable color on the merged image, display control of coloring an area where the value of the area map is closer to 1 in red, in blue, or the like. Displaying the particular area where an importance is placed on ease of visual recognition of characters in this way enables the user to understand at which area the character-recognition-first image estimation has been performed. Alternatively, the area map, the first image, and the second image may be displayed separately, and the position of the subject that is the target of visual recognition, the image-quality-first image, and the recognition-first image may be displayed in an at-a-glance identifiable manner.

The foregoing is an explanation of processing during run time of the image processing apparatus according to the first embodiment.

Next, a training apparatus that performs training regarding the above-described noise reduction processing will now be described. As described earlier, the hardware configuration of the training apparatus is the same as the hardware configuration of the image processing apparatus illustrated in FIG. 2.

Figure 5A:
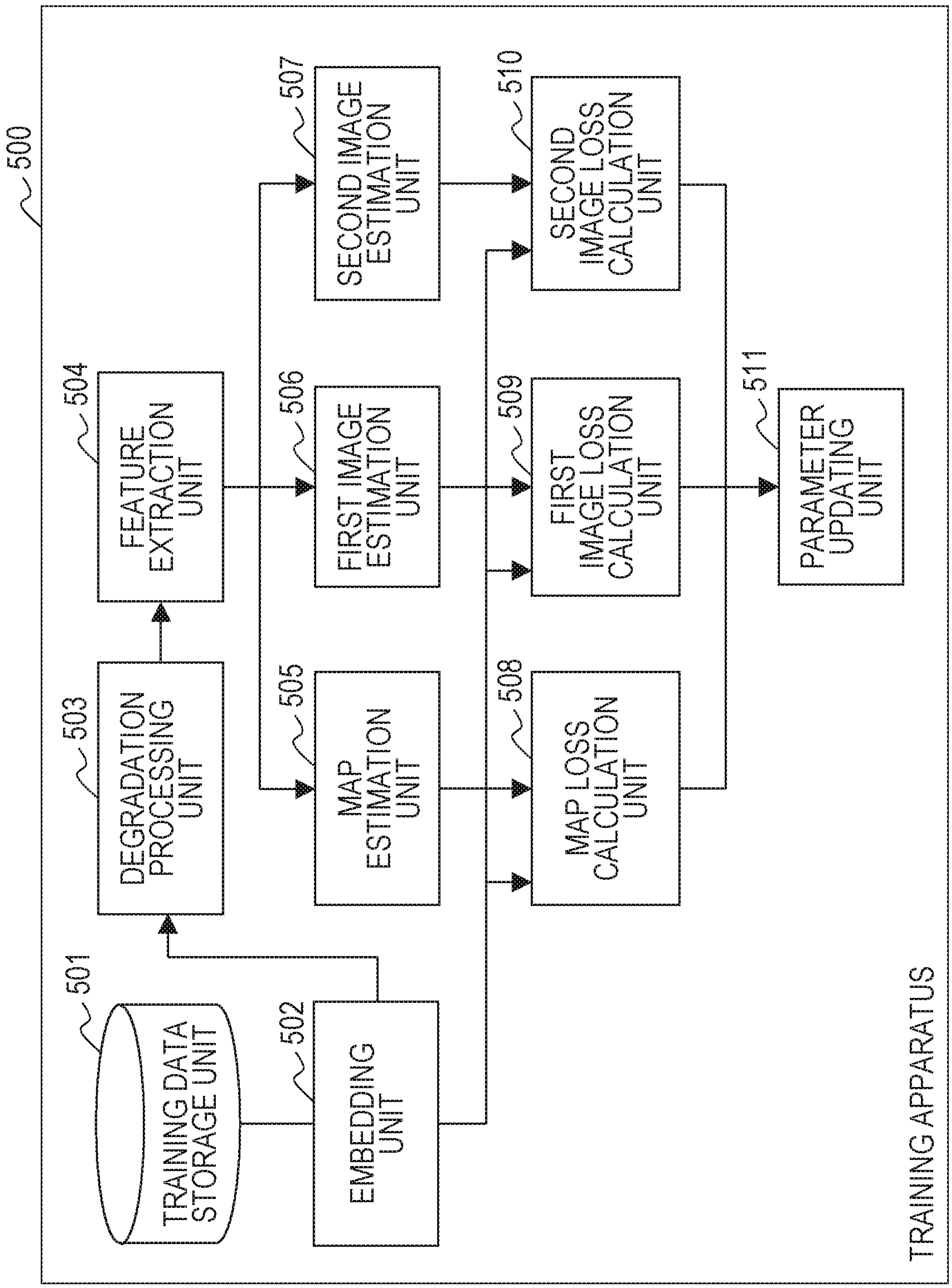
FIG. 5A is a diagram illustrating an example of a functional configuration of a training apparatus.

FIG. 5A is a block diagram illustrating an example of a functional configuration of the training apparatus according to the first embodiment. A training apparatus 500 includes a training data storage unit 501, an embedding unit 502, a degradation processing unit 503, a feature extraction unit 504, a map estimation unit 505, a first image estimation unit 506, and a second image estimation unit 507. The training apparatus 500 further includes a map loss calculation unit 508, a first image loss calculation unit 509, a second image loss calculation unit 510, and a parameter updating unit 511. The function of each of these blocks will now be described with reference to FIG. 6A and the like.

Figure 6A:
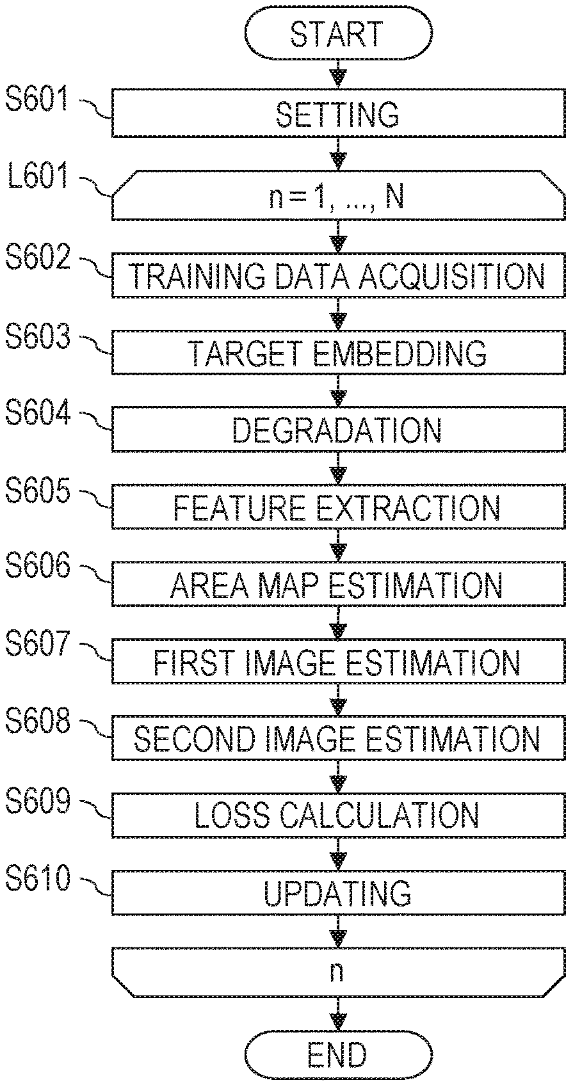
FIG. 6A is a flowchart illustrating an example of processing during training.

FIG. 6A is a flowchart illustrating an example of processing during training of the training apparatus according to the first embodiment.

In step S601, each functional unit of the training apparatus 500 performs setting regarding training. In the present embodiment, an explanation will be given while taking the training of a neural network as an example where it is assumed that the feature extraction unit 504, the map estimation unit 505, the first image estimation unit 506, and the second image estimation unit 507 are realized by the neural network illustrated in FIG. 7A. When a model of a neural network is trained from scratch, initial values of parameters of each layer of the model are set. Or when pre-trained parameters are additionally trained, the pre-trained parameters are set. In addition to the above, hyper-parameters regarding training are set. In the present embodiment, it is assumed that training is performed using stochastic gradient descent. Therefore, for example, parameters such as mini-batch size, training coefficient, solvers of stochastic gradient descent, and the like are set as the hyper-parameters.

Loop L601 in the flowchart illustrated in FIG. 6A is a loop regarding iteration in stochastic gradient descent. The number of times N of the loop may be a preset value. Alternatively, the loop processing may be terminated when the calculated loss drops to a certain value or less.

In step S602, the embedding unit 502 acquires training data from the training data storage unit 501. In the training data storage unit 501, image data of noiseless images, which are images with very little noise, are stored. The embedding unit 502 acquires, as the training data, image data of a noiseless image stored in the training data storage unit 501. The image data acquired here is image data of an image (for example, an RGB image, a grayscale image, a hyperspectral image or the like) matched to the target of noise reduction processing. For the reason to be described later, the noiseless image should preferably be an image having as few characters as possible. In this step S602, noiseless image acquisition is performed in a looped manner for the mini-batch size set in step S601.

In step S603, the embedding unit 502 performs processing of embedding the target of visual recognition to be trained into the noiseless image acquired in step S602. In the present embodiment, since noise reduction processing with an importance placed on ease of visual recognition of characters is performed, the target of visual recognition is "character". The embedding unit 502 embeds characters into the noiseless image at an appropriate position and generates a character area map indicating the area where the characters are embedded.

The number of the characters embedded, the position thereof, the type thereof, the font thereof, the font size thereof, the color thereof, and the like may be selected randomly. When this embedding is performed, an adjustment for reducing an overlap of characters and the like is performed as appropriate. The character area map generated in this step S603 is a binary map having a value of 1 at a character area and a value of 0 at an area other than the character area. The character area may be an externally tangential rectangle of the characters or may have a shape matched to the shape of the characters. In the description below, the embedded characters and information about the position of the characters (that is, coordinate information of the externally tangential rectangle of the characters) are treated as character GT, and the character area map is defined as area GT and is used in subsequent processing. GT is an acronym for Ground Truth and represents a correct-answer value.

As described above, characters are artificially embedded into an image, and information about the embedded characters is used as teaching data; therefore, the noiseless image stored in the training data storage unit 501 should preferably be an image having as few characters as possible. If the original image includes any character, the character will be a teaching-data-missing character, and, even if the position of this character is detected accurately by the map estimation unit 505, the detection will be treated as false detection, making it impossible to perform proper training. However, if the number of such samples is small, their impact on training is limited; therefore, the image may contain a small number of characters. A method of adding an annotation of character GT (position and type) by a human to an image that includes a character area, or a method of automatic generation by applying recognition processing such as OCR thereto, may be adopted. In this case, the processing in step S603 may be skipped by creating character GT in advance and pre-storing it in the training data storage unit 501 in association with the image.

In step S604, the degradation processing unit 503 performs image degradation processing to add noise to the character-embedded noiseless image. As described earlier, as the noise, noise that is produced in the process of conversion of a photon detected by a sensor into a digital signal is assumed, and the noise is assumed to be modeled. The degradation processing unit 503 generates noise from the noise model and adds the generated noise to the noiseless image, thereby artificially generating a noisy image.

In step S605, the feature extraction unit 504 extracts an intermediate feature from the image data to which the noise is added in step S604.

In step S606, the map estimation unit 505 estimates an area map from the intermediate feature extracted in step S605.

In step S607, the first image estimation unit 506 estimates a first image from the intermediate feature extracted in step S605.

In step S608, the second image estimation unit 507 estimates a second image from the intermediate feature extracted in step S605.

The processing in these steps S605 to S608 is realized by the neural network illustrated in FIG. 7A, similarly to the processing during run time described earlier. The processing in steps S605 to S608 is the same as the processing in steps S402 to S405 during run time described earlier with reference to FIG. 4A, respectively; therefore, a detailed explanation of it is omitted here.

In step S609, the map loss calculation unit 508, the first image loss calculation unit 509, and the second image loss calculation unit 510 calculate each loss for training of the model. In general, a loss is a barometer that indicates the performance of a model. Based on the results of inference by the model and based on GT, a loss is calculated using a loss function. Loss calculation is performed with selection of a suitable loss function depending on a model task. The map loss calculation unit 508, the first image loss calculation unit 509, and the second image loss calculation unit 510 constitute an example of a loss calculator.

The map loss calculation unit 508 calculates an area map loss, which is a loss for training the map estimation unit 505. Each pixel of the area map estimated by the map estimation unit 505 takes a real-number value from 0 to 1. The closer this value is to 1, the greater the likelihood of an area where an importance is placed on ease of visual recognition of characters. Therefore, for example, a loss function for a binary classification problem is used as the loss function. An example of a loss function for a binary classification problem is a logistic sigmoid function, but is not limited thereto. For example, if the size of the area where an importance is placed on ease of visual recognition of characters is significantly smaller than the size of the area where an importance is placed on image quality, with this imbalance considered, Focal Loss may be used as the loss function. In the calculation of the area map loss, as the GT, the area GT generated in step S603 is used. In the present embodiment, as the model for performing noise reduction processing, the neural network illustrated in FIG. 7A is used, and the map loss calculation unit 508 calculates a loss between the area map 704 and the area GT.

The first image loss calculation unit 509 calculates a first image loss, which is a loss for training the first image estimation unit 506. As described earlier, the first image is an image-quality-first image, and the area where an importance is placed on image quality and the area where an importance is placed on ease of visual recognition of characters are in a mutually exclusive relationship. The first image loss calculation unit 509 performs the following two-step calculation to calculate the first image loss.

As the first step, the first image loss calculation unit 509 calculates, for each pixel, a loss for training of image reconstruction. Losses used in a regression problem (L2 loss, L1 loss) are used as the loss function, and the noiseless image acquired in step S602 is used as the GT. In the model of the neural network illustrated in FIG. 7A, the first image loss calculation unit 509 calculates a loss between the first image 705 and the noiseless image.

As the second step, by using the area GT, the first image loss calculation unit 509 masks the loss calculated for each pixel. The area GT is a map in which the value of pixels corresponding to the area where an importance is placed on ease of visual recognition of characters is 1. Let $map_2^{GT}$ be the area GT. Let $map_1^{GT}$ be the mask that is used. The first image loss calculation unit 509 generates $map_1^{GT}$ using the following formula in Equation 2.

$$map_1^{GT} = 1 - map_2^{GT} \quad (2)$$

The first image loss calculation unit 509 gathers, by using $map_1^{GT}$, the losses of the pixels corresponding to the area where an importance is placed on image quality, among the losses of the pixels having been calculated in the first step, and totalizes the gathered losses of the pixels. Then, the first image loss calculation unit 509 acquires the number of elements whose value in $map_1^{GT}$ is 1, and calculates the loss of only the area where an importance is placed on image quality, by dividing the totalized loss (the sum of the losses of the pixels corresponding to the area where an importance is placed on image quality) by the number of elements. In this way, the first image loss calculation unit 509 calculates the first image loss at the area where the importance is placed on the first image.

The second image loss calculation unit 510 calculates a second image loss, which is a loss for training the second image estimation unit 507. As described earlier, the second image is a character-recognition-first image. Two losses, specifically, a reconstruction loss, which is a loss for training of image reconstruction, and a character classification loss, are used for the second image loss.

The reconstruction loss is calculated in two steps, similarly to the first image loss. As the first step, the second image loss calculation unit 510 calculates a loss for each pixel by using losses used in a regression problem and using the noiseless image acquired in step S602 as the GT. As the second step, by using the area GT, the second image loss calculation unit 510 masks the loss calculated for each pixel. For the masking, $map_2^{GT}$, which is the area GT, is used. That is, the second image loss calculation unit 510 gathers, by using $map_2^{GT}$, the losses of the pixels corresponding to the area where an importance is placed on ease of visual recognition of characters, and totalizes the gathered losses of the pixels. Then, the second image loss calculation unit 510 calculates the reconstruction loss of the area where an importance is placed on ease of visual recognition of characters by dividing the totalized loss by the number of elements whose value in $map_2^{GT}$ is 1.

Next, the character classification loss will now be described. A neural network configured to receive an input of an image with the characters drawn thereon and classify the type of characters is pre-trained. This kind of neural network is called "character classification model". The input image is a one-channel image having a pre-determined width and a pre-determined height and a grayscale color. The pre-trained character classification model is used here in a fixed manner without training in processing during this training.

By using the position information of the embedded characters (for example, coordinate information of the externally tangential rectangle of the characters) generated in step S603, the second image loss calculation unit 510 clips the second image corresponding to the character area out of the second image estimated in step S608. Next, the second image loss calculation unit 510 resizes the clipped image into the size of the input image of the character classification model, and further performs conversion into a grayscale format. If the second image is originally a grayscale image, this conversion into a grayscale format is unnecessary. The second image loss calculation unit 510 inputs the resized grayscale-converted image into the character classification model and calculates the character classification loss on the basis of the character classification results inferred by the character classification model and the information generated in step S603 about the embedded characters. The loss function used here may be any loss function in a multiclass classification problem. An example of a loss in a multiclass classification is a softmax cross entropy loss.

The second image loss calculation unit 510 mixes, with appropriate weighting, the reconstruction loss and the character classification loss regarding the second image, which have been calculated in this way. Since the importance is placed on ease of visual recognition of characters here, appropriate weighting is achieved by setting the weight of the character classification loss heavier. In this way, the second image loss calculation unit 510 calculates the second image loss at the area where the importance is placed on the second image.

The area map loss, the first image loss, and the second image loss are calculated through the above processing, and these three kinds of loss are mixed to obtain a final loss. Fixed values may be used for weighting in mixing these three kinds of loss, or, alternatively, the weights may be changed dynamically in such a way as to make the relative magnitudes of these three kinds of loss equal.

In step S610, the parameter updating unit 511 updates the parameters of the model of the neural network. When the neural network illustrated in FIG. 7A used in the present embodiment is employed, the parameter updating unit 511 determines an amount of updating the parameters of each layer by means of a backpropagation training algorithm on the basis of the loss calculated in step S609 and updates the parameters.

The foregoing is an explanation of processing during training according to the first embodiment. Through the processing in these steps, the parameters of the feature extraction unit 302, the map estimation unit 303, the first image estimation unit 304, the second image estimation unit 305, and the like to be used during run time of the image processing apparatus 300 are trained.

The image processing apparatus 300 according to the first embodiment estimates the second image by using the second image estimation unit 305 having been trained to obtain desired image quality, with an importance placed on ease of visual recognition of characters, at the particular area based on the area map. Then, the image processing apparatus 300 outputs the merged image (output image) obtained by, based on the area map, merging the first image, which is an image-quality-first image reconstructed with an importance placed on image quality as noise reduction processing, and the second image, which is a character-recognition-first image reconstructed with an importance placed on ease of visual recognition of characters as the noise reduction processing. By this means, for each of the area where the importance is placed on image quality in a noisy image and the area where the importance is placed on ease of visual recognition in the noisy image, it is possible to perform suitable noise reduction processing, and apply image processing for achieving desired image quality on an area-by-area basis, depending on which one of the two should be given an importance thereat.

Moreover, by performing training for image-quality-first noise reduction processing and character-recognition-first noise reduction processing, it is possible to perform optimized noise reduction processing on the noisy image, thereby realizing more appropriate noise reduction processing on an area-by-area basis.

First Variation Example of First Embodiment

Figure 4B:
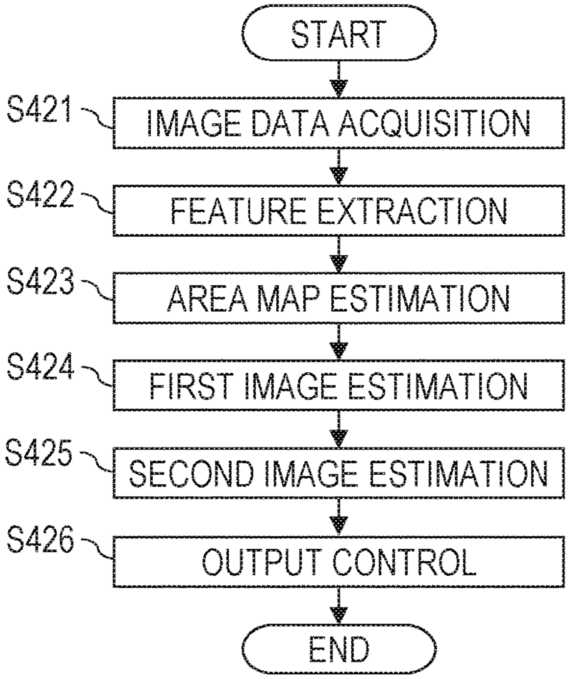
FIG. 4B is a flowchart illustrating another example of processing during run time.

In the first embodiment described above, the image processing apparatus 300 merges the first image and the second image. However, the scope of the present embodiment is not limited to the foregoing example. For example, the first image, the second image, and the area map may be outputted without merging. An example of processing during run time of the image processing apparatus in this case is illustrated in FIG. 4B. FIG. 4B is a flowchart illustrating another example of processing during run time (noise reduction processing) of the image processing apparatus according to the first embodiment.

In step S421, the acquisition unit 301 acquires image data of a noisy image that is the target of noise reduction processing.

In step S422, the feature extraction unit 302 extracts an intermediate feature from the image data acquired in step S421.

In step S423, by using a pre-trained model, the map estimation unit 303 estimates an area map from the intermediate feature extracted in step S422.

In step S424, by using a pre-trained model, the first image estimation unit 304 estimates a first image from the intermediate feature extracted in step S422.

In step S425, by using a pre-trained model, the second image estimation unit 305 estimates a second image from the intermediate feature extracted in step S422.

The processing in these steps S421 to S425 is the same as the processing in steps S401 to S405 during run time described earlier with reference to FIG. 4A, respectively; therefore, a detailed explanation of it is omitted here.

In step S426, the output control unit 307 performs processing for output control on each of the first image, the second image, and the area map having been generated, processing for superimposing the area map on the first image and the second image, and the like. The first image, the second image, and the area map may be used on another system, without performing the output processing in step S426.

Second Variation Example of First Embodiment

Figure 4C:
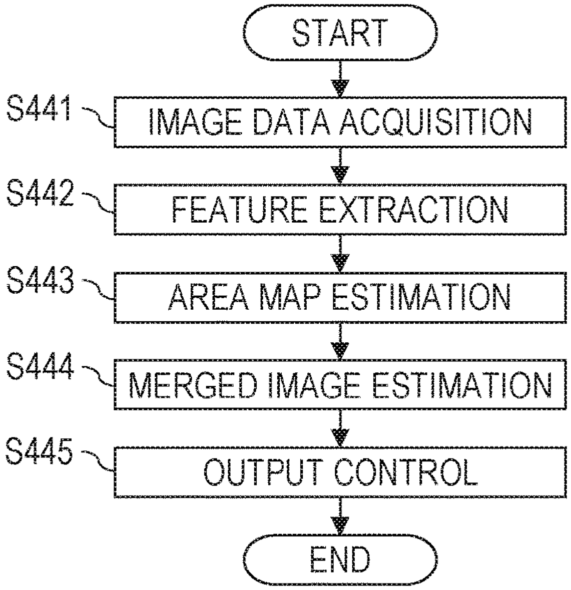
FIG. 4C is a flowchart illustrating another example of processing during run time.

In the first embodiment described above, the image processing apparatus 300 generates each of the first image and the second image at an intermediate stage. However, the scope of the present embodiment is not limited to the foregoing example. For example, the merged image may be generated without generating the first image and the second image. An example of processing during run time of the image processing apparatus in this case is illustrated in FIG. 4C. FIG. 4C is a flowchart illustrating another example of processing during run time (noise reduction processing) of the image processing apparatus according to the first embodiment.

In step S441, the acquisition unit 301 acquires image data of a noisy image that is the target of noise reduction processing.

In step S442, the feature extraction unit 302 extracts an intermediate feature from the image data acquired in step S441.

In step S443, by using a pre-trained model, the map estimation unit 303 estimates an area map from the intermediate feature extracted in step S442.

The processing in these steps S441 to S443 is the same as the processing in steps S401 to S403 during run time described earlier with reference to FIG. 4A, respectively; therefore, a detailed explanation of it is omitted here.

Figure 7B:
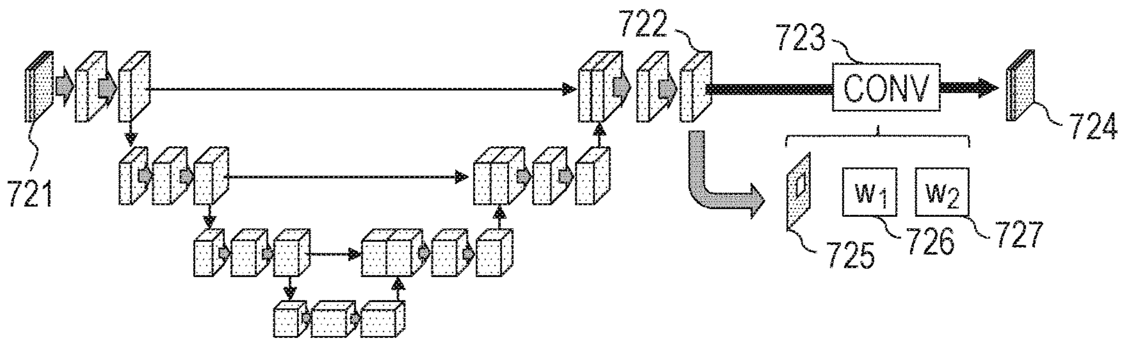
FIG. 7B is a diagram for explaining another example of a configuration of the neural network.

In step S444, based on the area map generated in step S443, an image estimation unit performs convolution using kernels that differ from area to area, and estimates a merged image from the intermediate feature extracted in step S442. The estimation of the merged image in this step S444 will now be described with reference to FIG. 7B. FIG. 7B is a diagram illustrating an example of a neural network assumed in this second variation example.

In FIG. 7B, 721 denotes an input image that is the target of processing, and 722 denotes an intermediate feature generated from the input image 721. The neural network illustrated in FIG. 7B includes a convolutional layer 723 configured to perform convolution using kernels that differ from area to area, and generates a merged image 724 by convoluting the intermediate feature 722. The convolutional layer 723 configured to perform convolution using kernels that differ from area to area will now be described.

In FIG. 7B, 725 denotes an area map that is similar to the area map 704 illustrated in FIG. 7A. In addition, 726 denotes a convolution kernel for generating a first image for reconstruction with an importance placed on image quality, and 727 denotes a convolution kernel for generating a second image for reconstruction with an importance placed on ease of visual recognition of characters. The convolutional layer 723 mixes the kernel 726 and the kernel 727 while referring to the area map 725 as a map for a position-by-position mixing ratio, and performs convolutional computation using the mixed kernel. A mixed kernel w(i, j) at a position (i, j) in the image is generated through arithmetic operation expressed by the following formula in Equation 3, where $\pi(i, j)$ denotes the value of the area map at the position (i, j), $w_1$ denotes the kernel of the convolutional layer for generating the first image, and $w_2$ denotes the kernel of the convolutional layer for generating the second image.

$$w(i, j) = (1 - \pi(i, j)) \odot w_1 + \pi(i, j)) \odot w_2, \quad (3)$$

where ⊙ denotes multiplication for each element.

In the above formula, the value $\pi(i, j)$ of the area map at the position (i, j) is the score of the area where an importance is placed on ease of visual recognition of characters (a real-number value from 0 to 1). Therefore, it follows that the value $(1-\pi(i, j))$ represents the score of the area where an importance is placed on image quality. By using the kernels that are generated in this way and differ from position to position, the image estimation unit generates the merged image 724.

In step S445, the output control unit 307 performs processing for output control on the generated merged image, and the like. The output control unit 307 may perform processing for superimposed display of the area map on the generated merged image, and the like. The merged image and the area map may be used on another system, without performing the output processing in step S445.

Third Variation Example of First Embodiment

In the foregoing first embodiment, an example of application to noise reduction processing has been described. However, the scope of application is not limited to noise reduction processing. The disclosed technique may be applied to any other kind of image-quality enhancement processing. For example, the disclosed technique may be applied to super-resolution processing, which is processing of estimating an output image having increased resolution such as fourfold-increased or eightfold-increased resolution with respect to the resolution of an input image.

Also in super-resolution processing, processing with an importance placed on ease of visual recognition of characters is conceivable, besides image quality. Applying the foregoing embodiment to super-resolution processing makes it possible to realize area-by-area super-resolution processing, in which image-quality-first super-resolution processing and character-recognition-first super-resolution processing are performed on an area-by-area basis. In this case, the map estimation unit, the first image estimation unit, and the second image estimation unit of the image processing apparatus 300 estimate the area map, the first image, and the second image respectively with resolution of a predetermined magnification with respect to the resolution of an input image. As for processing of each component of the image processing apparatus 300 other than them, processing matched to output resolution is performed. In addition, in the training processing, the degradation processing unit 503 of the training apparatus performs sub-sampling (reduction) processing on the image to reduce the resolution of the image. The above configuration realizes area-by-area super-resolution processing, in which switching is performed on an area-by-area basis between super-resolution processing with an importance placed on ease of visual recognition of characters, etc. and super-resolution processing with an importance placed on image quality.

Second Embodiment

In the foregoing first embodiment, area-by-area noise reduction processing, in which switching between two kinds of noise reduction, specifically, noise reduction with an importance placed on image quality for aiming for faithful reproduction of an image before degradation, and noise reduction with an importance placed on ease of visual recognition of characters rather than reproducibility, is performed on an area-by-area basis, has been described. In the area-by-area noise reduction processing disclosed herein, the noise reduction processing can be performed in a switched manner also for other kind of visual recognition other than character recognition.

In the second embodiment, an example of performing switching between noise reduction with an importance placed on image quality, noise reduction with an importance placed on ease of visual recognition of characters, and noise reduction with an importance placed on ease of visual recognition of an object on an area-by-area basis will be described. The aim of the noise reduction processing with an importance placed on ease of visual recognition of an object is to enhance object detection precision. It is assumed here that the object detection has a function of detecting an object of a plurality of categories. For example, a dataset called MS-COCO is a dataset used for an object detection task and labeled with object categories with object area masks regarding objects of eighty categories such as “person”, “car”, and the like. Regarding the score of an object detector having been trained using this dataset as the score of ease of visual recognition of an object, the noise reduction processing with an importance placed on ease of visual recognition of an object aims to perform noise reduction processing that improves the score of the object detector.

As described earlier, the hardware configuration of the image processing apparatus according to the second embodiment is the same as the hardware configuration of the image processing apparatus according to the first embodiment illustrated in FIG. 2.

Figure 3B:
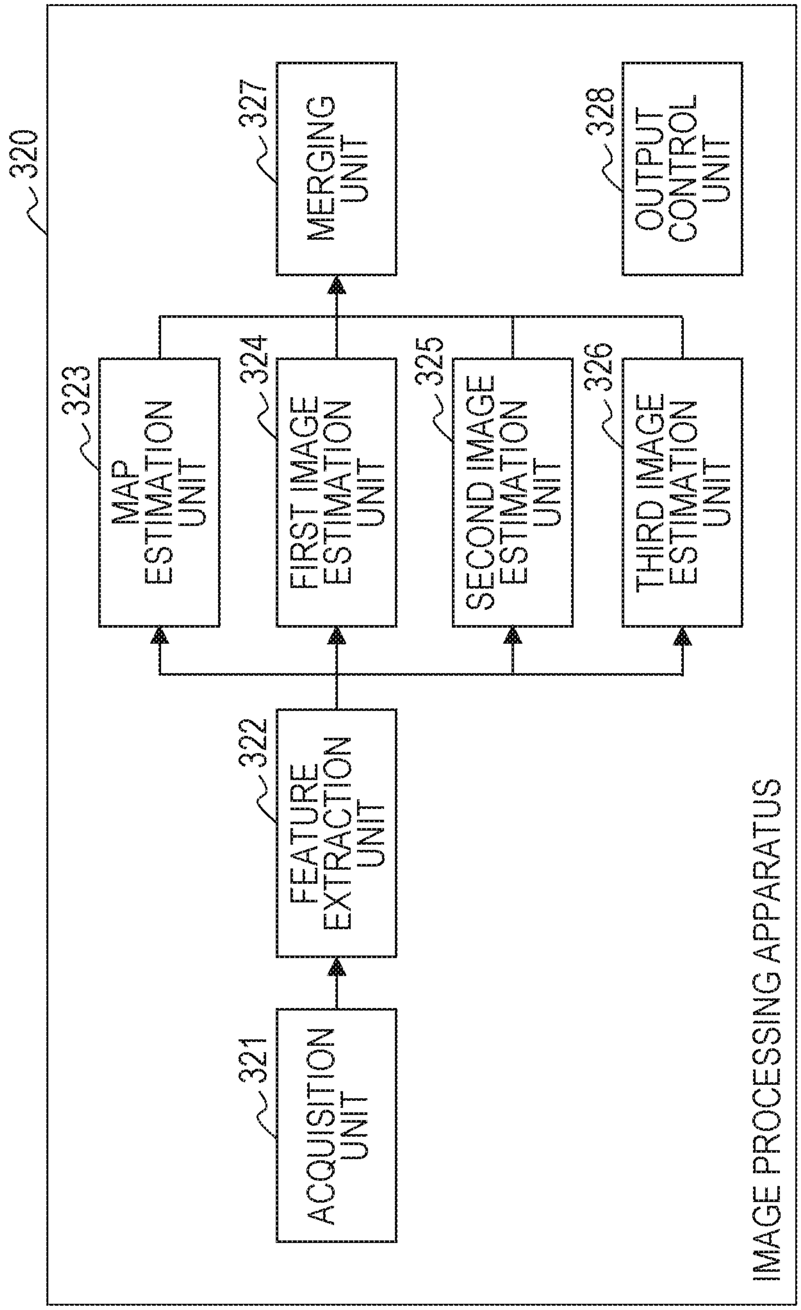
FIG. 3B is a diagram illustrating another example of a functional configuration of the image processing apparatus.

FIG. 3B is a block diagram illustrating an example of a functional configuration of the image processing apparatus according to the second embodiment. In FIG. 3B, an example of a functional configuration of the image processing apparatus according to the second embodiment for performing processing during run time is illustrated. An image processing apparatus 320 includes an acquisition unit 321, a feature extraction unit 322, a map estimation unit 323, a first image estimation unit 324, a second image estimation unit 325, a third image estimation unit 326, a merging unit 327, and an output control unit 328. The function of each of these blocks will now be described with reference to FIG. 4D and the like.

Figure 4D:
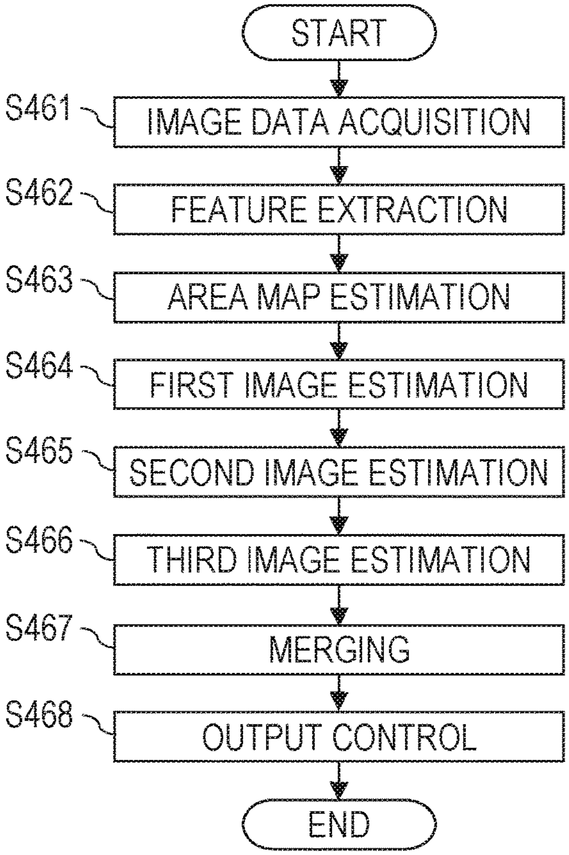
FIG. 4D is a flowchart illustrating another example of processing during run time.

FIG. 4D is a flowchart illustrating an example of processing during run time (noise reduction processing) of the image processing apparatus according to the second embodiment.

In step S461, the acquisition unit 321 acquires image data of a noisy image that is the target of noise reduction processing.

In step S462, the feature extraction unit 322 extracts an intermediate feature from the image data acquired in step S461.

The processing in steps S461 and S462 is the same as the processing in steps S401 and S402 during run time according to the first embodiment described earlier with reference to FIG. 4A, respectively; therefore, a detailed explanation of it is omitted here.

In step S463, by using a pre-trained model obtained through training processing to be described later, the map estimation unit 323 estimates an area map from the intermediate feature extracted in step S462. In the present embodiment, the map estimation unit 323 estimates a first area map that indicates an area where an importance is placed on ease of visual recognition of characters and a second area map that indicates an area where an importance is placed on ease of visual recognition of an object.

The first area map that indicates an area where an importance is placed on ease of visual recognition of characters is a map that indicates a character area similarly to the area map according to the first embodiment. The second area map that indicates an area where an importance is placed on ease of visual recognition of an object is a map that indicates an area where the target of detection by the object detector exists. The shape of the area may be an object area mask as in the dataset of MS-COCO or may be an externally tangential rectangle of the object. The object detector is configured for detecting the object of a plurality of categories. Therefore, the second area map may have channels the number of which corresponds to the number of categories of the object detector, may have channels the number of which corresponds to the number of groups where any plural number of categories are grouped, or may have a single integrated channel that is an integration of all categories.

As described above, in the present embodiment, the map estimation unit 323 generates, as the area map, the first area map that indicates the area where an importance is placed on ease of visual recognition of characters and the second area map that indicates the area where an importance is placed on ease of visual recognition of the object. It is assumed that the first area map and the second area map are not in a mutually exclusive relationship. However, depending on the target of selection as the area where area-specific noise reduction processing is to be performed, they may be in a mutually exclusive relationship. For example, in a case where an area of plants and trees and an area of an artificial object are treated as the target of area-specific noise reduction processing respectively, their area maps may be in a mutually exclusive relationship.

In step S464, by using a pre-trained model obtained through training processing to be described later, the first image estimation unit 324 estimates a first image from the intermediate feature extracted in step S462. The first image is an image-quality-first image reconstructed with an importance placed on image quality.

In step S465, by using a pre-trained model obtained through training processing to be described later, the second image estimation unit 325 estimates a second image from the intermediate feature extracted in step S462. The second image is a character-recognition-first image reconstructed with an importance placed on ease of visual recognition of characters.

The processing in these steps S464 and S465 is the same as the processing in steps S404 and S405 during run time according to the first embodiment described earlier with reference to FIG. 4A, respectively; therefore, a detailed explanation of it is omitted here.

In step S466, by using a pre-trained model obtained through training processing to be described later, the third image estimation unit 326 estimates a third image from the intermediate feature extracted in step S462. The third image is an "object-recognition-first" image reconstructed with an importance placed on ease of visual recognition of an object. The third image (object-recognition-first image) is also an image having the same vertical and horizontal size and the same number of channels as those of the input image. The third image, similarly to the first image and the second image, is estimated at a convolutional layer from the extracted intermediate feature.

In step S467, based on the estimation results in steps S463, S464, S465, and S466, the merging unit 327 generates and outputs a noise-reduced image. By using the first area map, the second area map, the first image, the second image, and the third image estimated in steps S463 to S466, the merging unit 327 performs image merging on the basis of the area map to generate the output image.

In the present embodiment, it is assumed that there exist two kinds of area map as the area map, namely, the first area map regarding the character area and the second area map regarding the object area, and they are not in a mutually exclusive relationship. In this case, for example, a merged image $img_{final}$ can be generated through computation expressed by the formula shown below in Equation 4.

$$img_{final} = (1 - \mathrm{map}_2 \mid \mathrm{map}_3) \odot img_1 + \mathrm{map}_2 \odot img_2/(\mathrm{map}_2 + \mathrm{map}_3) + \mathrm{map}_3 \odot img_3/(\mathrm{map}_2 + \mathrm{map}_3), \tag{4}$$

where $\odot$ denotes multiplication for each element, and/ denotes division for each element.

In Equation 4, $\mathrm{img}_1$ denotes the first image, $\mathrm{img}_2$ denotes the second image, $\mathrm{img}_3$ denotes the third image, $\mathrm{map}_2$ denotes the first area map regarding the character area, and $\mathrm{map}_3$ denotes the second area map regarding the object area. When the second area map regarding the object area has one channel, $\mathrm{map}_3$ is the area map of this one channel. When the second area map regarding the object area has a plurality of channels, $\mathrm{map}_3$ is a one-channeled map of a sum in channel direction. It is assumed that, however, $\mathrm{map}_3$ is multiplied by a softmax function, and the sum in channel direction is a value of 0 to 1. It is further assumed that $(\mathrm{map}_2 | \mathrm{map}_3)$ denotes an OR area of $\mathrm{map}_2$ and $\mathrm{map}_3$, and $(1-(\mathrm{map}_2 | \mathrm{map}_3))$ denotes the area where an importance is placed on image quality.

In step S468, the output control unit 328 performs control for outputting each generated image to an output device (display device). In this step S468, in addition to displaying the output image (merged image) generated in step S466 on a display device or the like, data having been generated through the processing up to step S468 may be visualized. The output image and the area map may be used on another system, without performing the output processing in step S468.

For example, in addition to displaying the output image (merged image) on the display device or the like, the output control unit 328 may perform control to output the area map (the first area map, the second area map) estimated in step S463. In the present embodiment, a case where the number of channels of the second area map regarding the object area is plural is conceivable. For example, when the second area map regarding the object area has one channel, it suffices to display the contour, etc. of the area estimated based on the map of the one channel as the area where an importance is placed on ease of visual recognition of an object. It is conceivable that, for example, group information or category information is also displayed together therewith in a case where the second area map has a plurality of grouped channels or channels for respective categories. In a case where the second area map has channels for respective categories, it is conceivable to display the contour of the area with specific colors assigned to person, car, etc. or display the category name near the contour.

The foregoing is an explanation of processing during run time of the image processing apparatus according to the second embodiment.

Next, a training apparatus that performs training regarding the above-described noise reduction processing will now be described. The hardware configuration of the training apparatus according to the second embodiment is also the same as the hardware configuration of the image processing apparatus according to the first embodiment illustrated in FIG. 2.

Figure 5B:
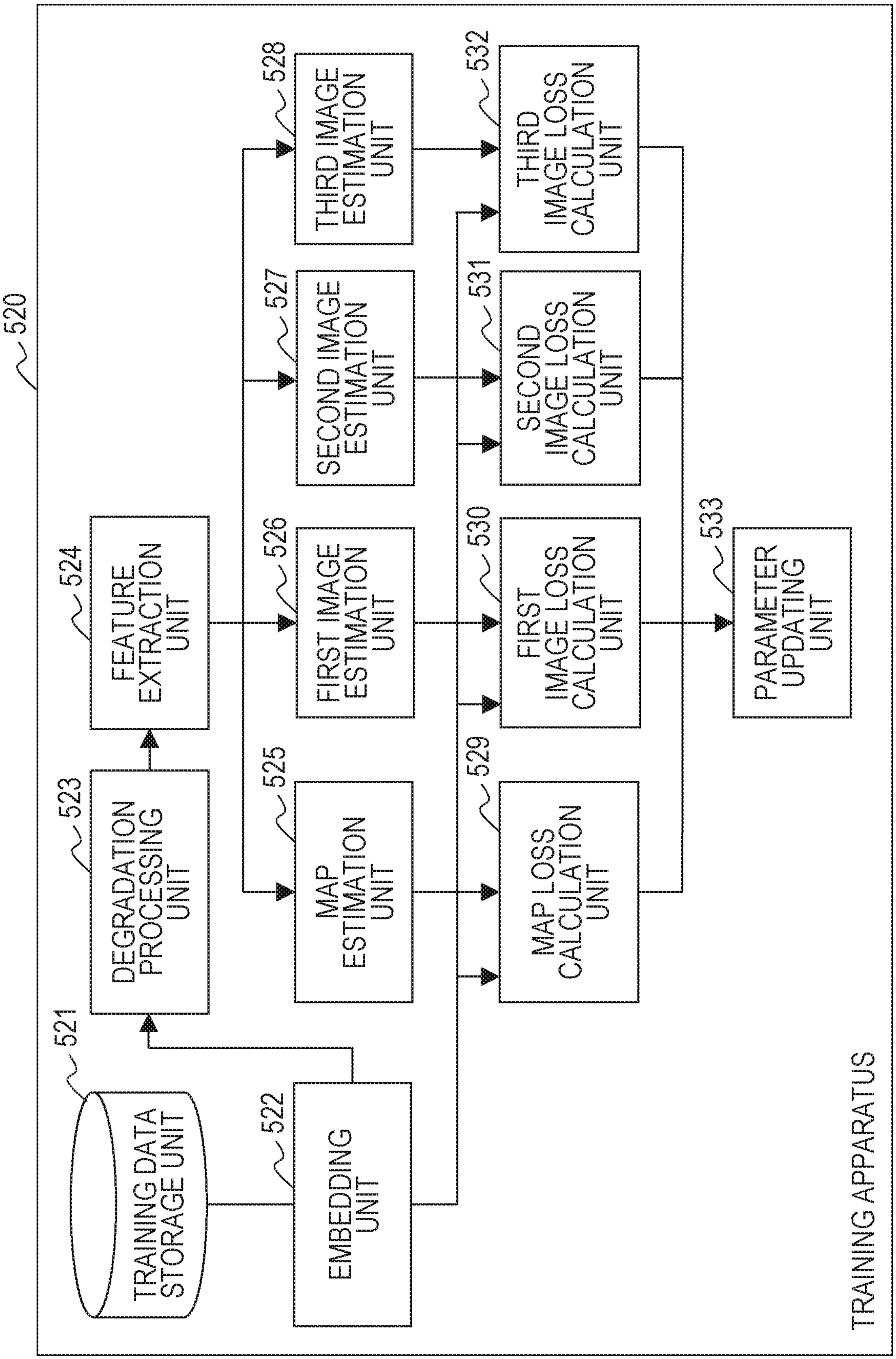
FIG. 5B is a diagram illustrating another example of a functional configuration of the training apparatus.

FIG. 5B is a block diagram illustrating an example of a functional configuration of the training apparatus according to the second embodiment. A training apparatus 520 includes a training data storage unit 521, an embedding unit 522, a degradation processing unit 523, a feature extraction unit 524, a map estimation unit 525, a first image estimation unit 526, a second image estimation unit 527, and a third image estimation unit 528. The training apparatus 520 further includes a map loss calculation unit 529, a first image loss calculation unit 530, a second image loss calculation unit 531, a third image loss calculation unit 532, and a parameter updating unit 533. The function of each of these blocks will now be described with reference to FIG. 6B and the like.

Figure 6B:
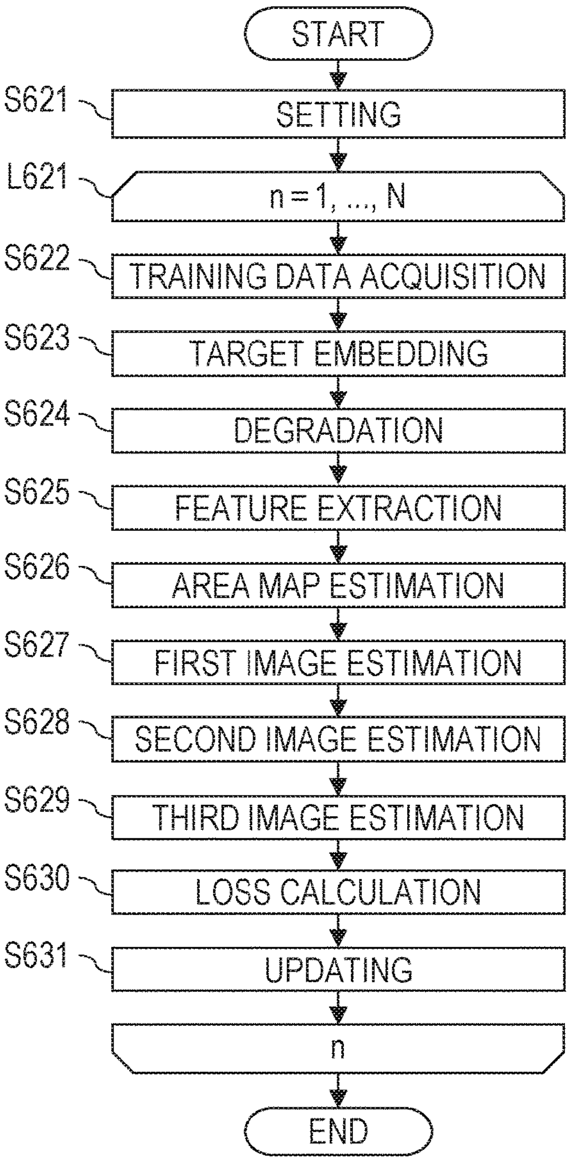
FIG. 6B is a flowchart illustrating another example of processing during training.

FIG. 6B is a flowchart illustrating an example of processing during training of the training apparatus according to the second embodiment.

In step S621, each functional unit of the training apparatus 520 performs setting regarding training. In the present embodiment, it is assumed that the feature extraction unit 524, the map estimation unit 525, the first image estimation unit 526, the second image estimation unit 527, and the third image estimation unit 528 are realized by the neural network illustrated in FIG. 7A similarly to the first embodiment. In this step S621, setting of initial values of parameters of each layer of the model or setting of pre-trained parameters, setting of hyper-parameters regarding training, and the like are performed.

Loop L621 in the flowchart illustrated in FIG. 6B is a loop regarding iteration in stochastic gradient descent. The number of times N of the loop may be a preset value. Alternatively, the loop processing may be terminated when the calculated loss drops to a certain value or less.

In step S622, the embedding unit 522 acquires training data corresponding to one mini-batch used in the training loop L621 from the training data storage unit 521. The training data is made up of noiseless images and GT data of a detection target object. The GT data of the detection target object is made up of area information of the target object and category label thereof. The area information is teaching data for training the map estimation unit 525, and is information that indicates an area mask contouring the shape of the target object or an externally tangential rectangle. The category label is a label for identification of the type of the target object, for example, person, car, or the like.

In step S623, the embedding unit 522 performs processing of embedding the target whose visual recognition is given importance into the noiseless image acquired in step S622. In the present embodiment, the target whose visual recognition is given importance is "character" and "object"; however, it is assumed that the object is already visually contained as the captured subject in the noiseless image. Therefore, in step S623, it is assumed that the embedding unit 522 embeds characters into the noiseless image similarly to the first embodiment. This processing of embedding characters is the same as that of the first embodiment. Though it is assumed in the present embodiment that the embedding unit 522 embeds characters in step S623, object embedding may be performed. In this case, associating, with the noiseless image, the area information about the object embedded in the noiseless image and the category label thereof as the GT data suffices.

In step S624, the degradation processing unit 523 performs image degradation processing to add noise to the after-embedding noiseless image, in which the target whose visual recognition is given importance is embedded. The processing in this step S624 is the same as the processing in step S604 during training according to the first embodiment described earlier with reference to FIG. 6A; therefore, a detailed explanation of it is omitted here.

In step S625, the feature extraction unit 524 extracts an intermediate feature from the image data to which the noise is added in step S624. The processing in this step S625 is the same as the processing in step S462 during run time of the image processing apparatus according to the second embodiment. That is, since the processing in step S625 is the same as the processing in step S402 during run time according to the first embodiment described earlier with reference to FIG. 4A, a detailed explanation of it is omitted here.

In step S626, the map estimation unit 525 estimates an area map from the intermediate feature extracted in step S625. In the present embodiment, the map estimation unit 525 estimates, as the area map, the first area map regarding ease of visual recognition of characters and the second area map regarding ease of visual recognition of an object. The processing in this step S626 is the same as the processing in step S463 during run time described earlier with reference to FIG. 4D; therefore, a detailed explanation of it is omitted here.

In step S627, the first image estimation unit 526 estimates a first image from the intermediate feature extracted in step S625.

In step S628, the second image estimation unit 527 estimates a second image from the intermediate feature extracted in step S625.

In step S629, the third image estimation unit 528 estimates a third image from the intermediate feature extracted in step S625.

The processing in steps S627 and S628 is the same as the processing in steps S464 and S465 during run time of the image processing apparatus according to the second embodiment. That is, since the processing in steps S627 and S628 is the same as the processing in steps S404 and S405 during run time according to the first embodiment described earlier with reference to FIG. 4A, a detailed explanation of it is omitted here. The processing in step S629 is the same as the processing in step S466 during run time of the image processing apparatus according to the second embodiment; therefore, a detailed explanation of it is omitted here.

In step S630, the map loss calculation unit 529, the first image loss calculation unit 530, the second image loss calculation unit 531, and the third image loss calculation unit 532 calculate each loss for training of the model.

The map loss calculation unit 529 calculates an area map loss, which is a loss for training the map estimation unit 525. In the present embodiment, with regard to the area map loss, the map loss calculation unit 529 calculates each of the area map loss of the character area and the area map loss of the object area. The calculation of the area map loss of the character area is the same as that of the first embodiment. The area map loss of the object area is calculated in accordance with the second area map regarding the object area estimated by the map estimation unit 525.

In a case where the map estimation unit 525 estimates an object area map of one channel only, the map loss calculation unit 529 generates an area map GT of one channel by using the GT data of the detection target object acquired in step S622. Then, the map loss calculation unit 529 calculates the area map loss of the object area by using the generated area map GT. In a case where the map estimation unit 525 estimates an object area map of a plurality of channels, the map loss calculation unit 529 generates an area map GT of a desired plurality of channels by using the GT data of the detection target object, and calculates the area map loss by using it. The loss function may be selected based on the number of channels of the area map or the like. In the object area map of a plurality of channels, as an example, a multiclass cross entropy loss is selected.

The calculation of the first image loss for training the first image estimation unit 526 by the first image loss calculation unit 530 and the calculation of the second image loss for training the second image estimation unit 527 by the second image loss calculation unit 531 are the same as those of the first embodiment; therefore, a detailed explanation of it is omitted here.

The third image loss calculation unit 532 calculates a loss regarding ease of visual recognition of an object, which is a loss for training the third image estimation unit 528. It is assumed here that the loss regarding object detection is calculated by multiplying the pre-trained object detector by the third image generated by the third image estimation unit 528. Specifically, the third image loss calculation unit 532 acquires the output of the object detector (the externally tangential rectangle and the score for each category), and evaluates IOU (Intersection Over Union) of the externally tangential rectangle of the output and the externally tangential rectangle of the GT. If the IOU of the externally tangential rectangle of the output and the externally tangential rectangle of the GT is a certain value or greater, the third image loss calculation unit 532 obtains its score for each category. The score for each category is one-dimensional vector having elements corresponding to the number of categories, where the sum of the elements of the vector is 1. The GT is a vector having elements corresponding to the number of categories, where the correct-answer category is 1, and other categories are 0. Based on the vector of the output score and the vector of the GT, the third image loss calculation unit 532 performs loss calculation using an appropriate loss function. An example of the loss function is in a multiclass cross entropy loss.

The losses calculated by the map loss calculation unit 529, the first image loss calculation unit 530, the second image loss calculation unit 531, and the third image loss calculation unit 532 are mixed to obtain a final loss. Fixed values may be used for weighting in mixing these losses, or, alternatively, the weights may be changed dynamically in such a way as to make the relative magnitudes of the losses constant.

In step S631, the parameter updating unit 533 updates the parameters of the model of the neural network. The parameter updating unit 533 determines an amount of updating the parameters of each layer by means of a backpropagation training algorithm on the basis of the loss calculated in step S630 and updates the parameters.

The foregoing is an explanation of processing during training according to the second embodiment. Through the processing in these steps, the parameters of the feature extraction unit 322, the map estimation unit 323, the first image estimation unit 324, the second image estimation unit 325, the third image estimation unit 326, and the like to be used during run time of the image processing apparatus 320 are trained.

The image processing apparatus 300 according to the second embodiment estimates the second image by using the second image estimation unit 325 having been trained to obtain desired image quality, with an importance placed on ease of visual recognition of characters, at the character-recognition-first area on the basis of the area map. In addition, the image processing apparatus according to the second embodiment estimates the third image by using the third image estimation unit 326 having been trained to obtain desired image quality, with an importance placed on ease of visual recognition of an object, at the object-recognition-first area on the basis of the area map. Then, the image processing apparatus 300 outputs the merged image (output image) obtained by, based on the area map, merging the first image reconstructed with an importance placed on image quality, the second image reconstructed with an importance placed on ease of visual recognition of characters, and the third image reconstructed with an importance placed on ease of visual recognition of an object. By this means, for each of the area where the importance is placed on image quality in a noisy image, the area where the importance is placed on ease of visual recognition of characters in the noisy image, and the area where the importance is placed on ease of visual recognition of an object in the noisy image, it is possible to perform suitable noise reduction processing, and apply image processing for achieving desired image quality on an area-by-area basis, depending on which one should be given an importance thereat.

Moreover, by performing training for image-quality-first noise reduction processing, character-recognition-first noise reduction processing, and object-recognition-first noise reduction processing, it is possible to perform optimized noise reduction processing on the noisy image, thereby realizing more appropriate noise reduction processing on an area-by-area basis.

Variation Example of Second Embodiment

In the second embodiment described above, the respective models (image estimation units) of noise reduction processing are trained separately at the area where an importance is placed on ease of visual recognition of characters and the area where an importance is placed on ease of visual recognition of an object, and the respective noise-reduced images are generated separately at the two areas. Ease of visual recognition of characters and ease of visual recognition of an object may be simply treated in an integrated manner as a single target recognizability, and area-by-area noise reduction processing may be performed using two models, one of which is a noise reduction model with an importance placed on image quality, and the other of which is a noise reduction model with an importance placed on target recognizability. When configured in this way, the functional configuration of the image processing apparatus is the same as that of the image processing apparatus 300 illustrated in FIG. 3A, and the functional configuration of the training apparatus is the same as that of the training apparatus 500 illustrated in FIG. 5A.

In the processing during run time of the image processing apparatus 300, the second image estimation unit 305 generates a noise-reduced image through reconstruction with an importance placed on target recognizability. In the processing during training of the training apparatus 500, the second image loss calculation unit 510 performs loss calculation and training on the basis of the second image estimated by the second image estimation unit 507. At the second image loss calculation unit 510, the character classification loss and the object detection loss are merged as the second image loss. At the map loss calculation unit 508, loss calculation is performed while taking the OR area of the character area and the object area as the GT. Then, the parameter updating unit 511 merges the area map loss, the first image loss, and the second image loss that have been calculated, and updates the parameters. Each weight at the time of the loss merging is set appropriately.

Implementing this variation makes it possible to perform area-by-area noise reduction processing including noise reduction processing with an importance placed on image quality and noise reduction processing with an importance placed on target recognizability, which is an integration of ease of visual recognition of characters and ease of visual recognition of an object.

Third Embodiment

In the foregoing first and second embodiments, noise reduction processing for a still image has been disclosed. However, the scope of application is not limited to a still image. The disclosed technique may be applied to a moving image. Described below in a third embodiment is an example of applying, to a moving image, area-by-area noise reduction processing in which noise reduction with an importance placed on image quality and noise reduction with an importance placed on ease of visual recognition of characters are performed on an area-by-area basis.

The configuration of an image processing apparatus according to the present embodiment, and the flow of processing during run time of the image processing apparatus, are the same as those of the first embodiment. The points of difference in the third embodiment from the foregoing first embodiment will be described below. Since training in the present embodiment can be performed in the same manner as done in the first embodiment, it is not explained here.

Figure 7C:
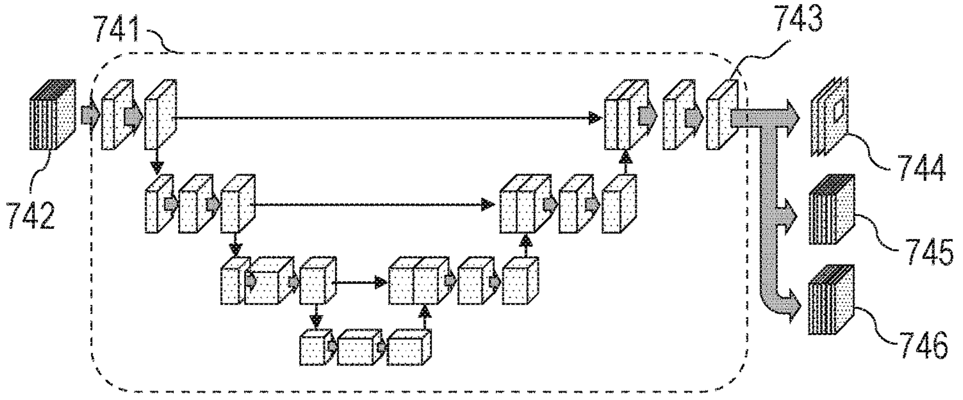
FIG. 7C is a diagram for explaining another example of a configuration of the neural network.

FIG. 7C is a diagram illustrating an example of a neural network assumed in the third embodiment. In the present embodiment, a series of still images arranged in a temporal sequence will be treated as a moving image. These still images will be hereinafter referred to as "frame".

In FIG. 7C, 741 denotes a UNet neural network configured to receive an input of a plurality of noise-degraded frames and perform noise reduction processing on the plurality of frames. In the present embodiment, noise reduction processing is performed on a moving image by processing a chunk of a plurality of frames successively in a time series. In the illustrated network, 742 denotes an input made up of a plurality of frames, and 743 denotes an intermediate feature generated from the input 742. The input 742 is assumed to be a three-dimensional tensor connected in channel direction. For example, when one frame has three channels of RGB and five frames are treated as one chunk, the input 742 has fifteen channels (three channels multiplied by five frames).

In FIG. 7C, 744 denotes an area map corresponding to each frame of the input 742 timewise. When the input 742 corresponds to five frames, the area map 744 is outputted as a five-channel tensor for five frames of one-channel area maps representing character area. In the illustrated network, 745 denotes an output of noise-reduced images (the first image) reconstructed with an importance placed on image quality and corresponding to each frame of the input 742 timewise, and 746 denotes an output of noise-reduced images (the second image) reconstructed with an importance placed on ease of visual recognition of characters and corresponding to each frame of the input timewise. Each of the output 745 of noise-reduced images and the output 746 of noise-reduced images is an output of a fifteen-channel tensor that is the same as the input 742 for the input 742 of five frames.

That is, the neural network 741 is an hourglass-type neural network with a five-frame input and a five-frame output timewise. The foregoing is an explanation of an example of the neural network according to the present embodiment.

Next, with reference to the flowchart of FIG. 4A, the flow of processing during run time of the image processing apparatus according to the third embodiment will now be described. When noise reduction processing is applied to a moving image, the processing illustrated in the flowchart is performed a plurality of times till the end of the last frame of the moving image.

In step S401, the acquisition unit 301 acquires a chunk of input images made up of a plurality of frames. For example, if the size of the chunk is 5, in the first execution of the processing illustrated in the flowchart, the acquisition unit 301 acquires, as input image data, five frames in total from the zeroth frame to the fourth frame sequentially. In the second and subsequent execution of the processing, the acquisition unit 301 pre-determines a stride from the first frame to the fifth frame and acquires a chunk of input images based on the pre-determined stride. For example, in the second execution of the processing, the acquisition unit 301 acquires five frames in total from the first frame to the fifth frame as input image data if the stride is 1, or acquires five frames in total from the fifth frame to the ninth frame as input image data if the stride is 5. Therefore, in a case where the stride is 1 to 4, when the processing illustrated in the flowchart is performed a plurality of times, an overlap occurs in the frames that are processed. The processing result of the overlapped frames will be described later.

In the description below, it is assumed that the size of the chunk is five.

In step S402, the feature extraction unit 302 extracts an intermediate feature from the image data acquired in step S401. This processing of extracting the intermediate feature is the same as the processing of the first embodiment; therefore, it is not explained here.

In step S403, the map estimation unit 303 estimates area maps corresponding to the input frames. In a case where the input frames are five frames from the zeroth frame to the fourth frame, the map estimation unit 303 estimates the area maps of five frames corresponding thereto. In a case where the stride in step S401 is 1 to 4, an overlap occurs in the frames that are processed. With regard to the generated overlap, the map estimation unit 303 performs, for example, averaging of area maps corresponding to the same input frames having been estimated previously, to integrate the area maps corresponding to the same input frames into one. Except for the above, the processing is the same as the processing in step S403 according to the first embodiment.

The processing of estimating the first image in step S404 and the processing of estimating the second image in step S405 are also performed to estimate the first image and the second image of five frames corresponding to the input frames, in the same manner as in the processing in step S403. Moreover, similarly to the area map estimation, integration into one frame is performed in a case of an overlap in the frames that are processed. Except for the above, the processing is the same as the processing in steps S404 and S405 according to the first embodiment.

In step S406, the merging unit 306 merges, for each frame, the area maps, the first images, and the second images corresponding to the input frames and having been estimated as described above. The merging for one frame is the same as the processing in step S406 according to the first embodiment, and this processing is performed here a plurality of times corresponding to the number of frames.

In step S407, the output control unit 307 performs control for outputting the generated merged image and the generated area map to an output device. The processing for one frame is the same as the processing in step S407 according to the first embodiment, and this processing is performed a plurality of times corresponding to the number of frames. Graphic processing for making it easier for the user to view the display image such as, for example, performing image display in accordance with the frame rate of the moving image, is performed at this time.

According to the third embodiment, by performing the processing as described above, it is possible to expand the area-by-area noise reduction processing described in the first embodiment to moving-image application.

Though an hourglass-type neural network with a five-frame input and a five-frame output is taken as an example here, this does not imply any limitation. A recursive neural network or the like may be used. Even in that case, basically, applying each processing of the flowchart illustrated in FIG. 4A to a moving image will suffice.

All of the foregoing embodiments show just some examples in specific implementation of the present disclosure. The technical scope of the present disclosure shall not be construed restrictively by these examples. That is, the present disclosure can be embodied in various modes without departing from its technical spirit or from its major features.

With the present disclosure, it is possible to apply image processing for achieving desired image quality on an area-by-area basis to an image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-026043, filed Feb. 22, 2023, which is hereby incorporated by reference herein in its entirety.

What is claimed is:

1. An image processing apparatus, comprising:

one or more processors; and one or more memories storing instructions executable by the one or more processors to cause the image processing apparatus to operate as:

a feature extractor configured to extract an intermediate feature from an input image;

a map estimator configured to estimate an area map from the intermediate feature;

a first image estimator configured to estimate a first image from the intermediate feature by applying first image processing to the input image;

a second image estimator configured to estimate a second image from the intermediate feature by applying second image processing different in characteristics from the first image processing to the input image; and an outputter configured to output an output image obtained by merging the first image and the second image based on the area map, wherein the second image estimator is trained to obtain predetermined image quality at a particular area based on the area map in the second image, wherein the first image processing and second image processing are noise reduction processing, and the second image is an image obtained through the noise reduction processing performed with an importance placed on ease of visual recognition noise.

2. The image processing apparatus according to claim 1, wherein the area map is a map that indicates whether an area is an area where an importance is placed on the first image processing or an area where an importance is placed on the second image processing.

3. The image processing apparatus according to claim 2, wherein the outputter outputs the output image obtained by merging the first image and the second image at a ratio corresponding to a value indicated by the area map for each pixel.

4. The image processing apparatus according to claim 2, wherein the outputter outputs the output image generated by using the first image at the area where the importance is placed on the first image processing in the area map and by using the second image at the area where the importance is placed on the second image processing in the area map.

5. The image processing apparatus according to claim 1, wherein the first image is an image obtained through the noise reduction processing performed with an importance placed on image quality.

6. The image processing apparatus according to claim 1, wherein the ease of visual recognition is at least one of ease of visual recognition of a character and ease of visual recognition of an object.

7. The image processing apparatus according to claim 1, wherein the input image is an image degraded due to noise.

8. The image processing apparatus according to claim 1, wherein the first image processing and the second image processing are super-resolution processing.

9. The image processing apparatus according to claim 8, wherein the first image is an image having been subjected to the super-resolution processing performed with an importance placed on image quality.

10. The image processing apparatus according to claim 8, wherein the second image is an image having been subjected to the super-resolution processing performed with an importance placed on ease of visual recognition.

11. The image processing apparatus according to claim 1, wherein the input image includes a plurality of successive images timewise, the area map is a plurality of area maps corresponding to the plurality of images of the input image, the first image is a plurality of first images corresponding to the plurality of images of the input image, and the second image is a plurality of second images corresponding to the plurality of images of the input image.

12. The image processing apparatus according to claim 1, further operating as a third image estimator configured to estimate a third image from the intermediate feature, wherein the outputter outputs the output image obtained by merging the first image, the second image, and the third image based on the area map, and the third image estimator is trained to obtain predetermined image quality at a particular area based on the area map in the third image.

13. The image processing apparatus according to claim 12, wherein the second image is an image obtained through image processing performed with an importance placed on ease of visual recognition of a first target, and the third image is an image obtained through image processing performed with an importance placed on ease of visual recognition of a second target different from the first target.

14. An image processing method, comprising:

extracting an intermediate feature from an input image;

estimating an area map from the intermediate feature;

estimating a first image from the intermediate feature by applying first image processing to the input image;

estimating a second image from the intermediate feature by applying second image processing different in characteristics from the first image processing to the input image; and outputting an output image obtained by, based on the area map, merging the first image and the second image, wherein in the estimating of the second image, a model trained to obtain predetermined image quality at a particular area based on the area map in the second image is used, wherein the first image processing and second image processing are noise reduction processing, and the second image is an image obtained through the noise reduction processing performed with an importance placed on ease of visual recognition noise.

15. A non-transitory computer-readable storage medium storing instructions that, when executed by one or more processors of an image processing apparatus, configures the image processing apparatus to execute a method comprising:

extracting an intermediate feature from an input image;

estimating an area map from the intermediate feature;

estimating a first image from the intermediate feature by applying first image processing to the input image;

estimating a second image from the intermediate feature by applying second image processing different in characteristics from the first image processing to the input image; and outputting an output image obtained by, based on the area map, merging the first image and the second image, wherein in the estimating of the second image, a model trained to obtain predetermined image quality at a particular area based on the area map in the second image is used, wherein the first image processing and second image processing are noise reduction processing, and the second image is an image obtained through the noise reduction processing performed with an importance placed on ease of visual recognition noise.

* * * * *